United States Patent
Kahlstorf

(10) Patent No.: US 6,511,088 B2
(45) Date of Patent: Jan. 28, 2003

(54) VERSITILE TRAILER HITCH MOUNTING SYSTEM

(76) Inventor: William Kahlstorf, 38 Molly La., Chads Ford, PA (US) 19317

(*) Notice: Subject to any disclaimer, the term of this patent is extended or adjusted under 35 U.S.C. 154(b) by 0 days.

(21) Appl. No.: 09/909,771

(22) Filed: Jul. 20, 2001

(65) Prior Publication Data

US 2002/0008364 A1 Jan. 24, 2002

Related U.S. Application Data

(60) Provisional application No. 60/219,606, filed on Jul. 21, 2000.

(51) Int. Cl.[7] .................................................. B60R 9/06
(52) U.S. Cl. ..................................... 280/415.1; 224/521
(58) Field of Search ........................... 280/415.1, 416.1, 280/416.3, 491.5, 491.1, 491.2; 224/519, 520, 521, 524, 924; 108/44

(56) References Cited

U.S. PATENT DOCUMENTS

| | | | | |
|---|---|---|---|---|
| 4,856,686 A | * | 8/1989 | Workentine | |
| 5,377,886 A | * | 1/1995 | Sickler | |
| 5,397,147 A | | 3/1995 | Ducharme et al. | |
| 5,460,304 A | * | 10/1995 | Porter et al. | 224/521 |
| 5,497,927 A | * | 3/1996 | Peterson | 224/519 |
| 5,549,231 A | * | 8/1996 | Flethcer et al. | 224/536 |
| 5,570,826 A | * | 11/1996 | Garbers et al. | 224/524 |
| 5,695,103 A | * | 12/1997 | Duvernay | 224/532 |
| 5,752,639 A | | 5/1998 | Rice | |
| 5,857,741 A | | 1/1999 | Anderson | |
| 6,070,926 A | * | 6/2000 | Hardin | 296/26.08 |
| 6,085,954 A | * | 7/2000 | Bloemer | 224/509 |
| 6,129,371 A | * | 10/2000 | Powell | 280/461.1 |
| 6,336,413 B1 | * | 1/2002 | Ball | 108/44 |

* cited by examiner

Primary Examiner—Anne Marie Boehler
(74) Attorney, Agent, or Firm—Matthew J. Peire

(57) ABSTRACT

The present invention concerns that of a new and improved apparatus which enables mounting of heavy duty equipment to existing trailer hitch hardware currently found on my pickups, vans, SUV's, recreational vehicles, and automobiles. The type of heavy duty equipment that could be attached to the apparatus of the present invention would include a heavy duty table, a work station, a vise, a spool and/or a winch, and a level working surface.

3 Claims, 1 Drawing Sheet

VERSITILE TRAILER HITCH MOUNTING SYSTEM

This application claims the benefit of Provisional Application No. 60/219,606, filed Jul. 21, 2000.

BACKGROUND OF THE INVENTION

The present invention concerns that of a new and improved apparatus which enables mounting of heavy duty equipment to existing trailer hitch hardware currently found on my pickups, vans, SUV's, recreational vehicles, and automobiles.

DESCRIPTION OF THE PRIOR ART

U.S. Pat. No. 5,857,741, issued to Anderson, discloses a vehicle trailer hitch mounted table and chairs which can be used for tailgate parties.

U.S. Pat. No. 5,752,639, issued to Rice, discloses a holding or carrying device that is mountable to a trailer hitch which comprises a support member having a horizontal portion that is removably attachable to the hitch and a vertical portion that contains a tubular telescoping element.

U.S. Pat. No. 5,397,147, issued to Ducharme et al., discloses a5 vehicular work table apparatus.

SUMMARY OF THE INVENTION

The present invention concerns that of a new and improved apparatus which enables mounting of heavy duty equipment to existing trailer hitch hardware currently found on my pickups, vans, SUV's, recreational vehicles, and automobiles. The type of heavy duty equipment that could be attached to the apparatus of the present invention would include a heavy duty table, a work station, a vise, a spool and/or a winch, and a level working surface.

There has thus been outlined, rather broadly, the more important features of an apparatus which enables mounting of heavy duty equipment to existing trailer hitch hardware in order that the detailed description thereof that follows may be better understood and in order that the present contribution to the art may be better appreciated. There are, of course, additional features of the apparatus which enables mounting of heavy duty equipment to existing trailer hitch hardware that will be described hereinafter and which will form the subject matter of the claims appended hereto.

In this respect, before explaining at least one embodiment of the apparatus which enables mounting of heavy duty equipment to existing trailer hitch hardware in detail, it is to be understood that the electrical connection cover is not limited in its application to the details of construction and to the arrangements of the components set forth in the following description or illustrated in the drawings. The apparatus which enables mounting of heavy duty equipment to existing trailer hitch hardware is capable of other embodiments and being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present apparatus which enables mounting of heavy duty equipment to existing trailer hitch hardware. It is important, therefore, that the claims be regard as including such equivalent constructions insofar as they do not depart from the spirit and scope of the present invention.

It is therefore an object of the present invention to provide an apparatus which enables mounting of heavy duty equipment to existing trailer hitch hardware which has all of the advantages of the prior art and none of the disadvantages.

It is another object of the present invention to provide an apparatus which enables mounting of heavy duty equipment to existing trailer hitch hardware which may be easily and efficiently manufactured and marketed.

It is another object of the present invention to provide an apparatus which enables mounting of heavy duty equipment to existing trailer hitch hardware which is of durable and reliable construction.

It is yet another object of the present invention to provide an apparatus which enables mounting of heavy duty equipment to existing trailer hitch hardware which is economically affordable and available to the buying public.

It is yet another object of the present invention to provide an apparatus which enables mounting of heavy duty equipment to existing trailer hitch hardware which provides additional benefits not present in the prior art.

Other objects, features and advantages of the present invention will become more readily apparent from the following detailed description of the preferred embodiment when considered with the attached drawings and appended claims.

DESCRIPTION OF THE PREFERRED EMBODIMENT

Figure 1:
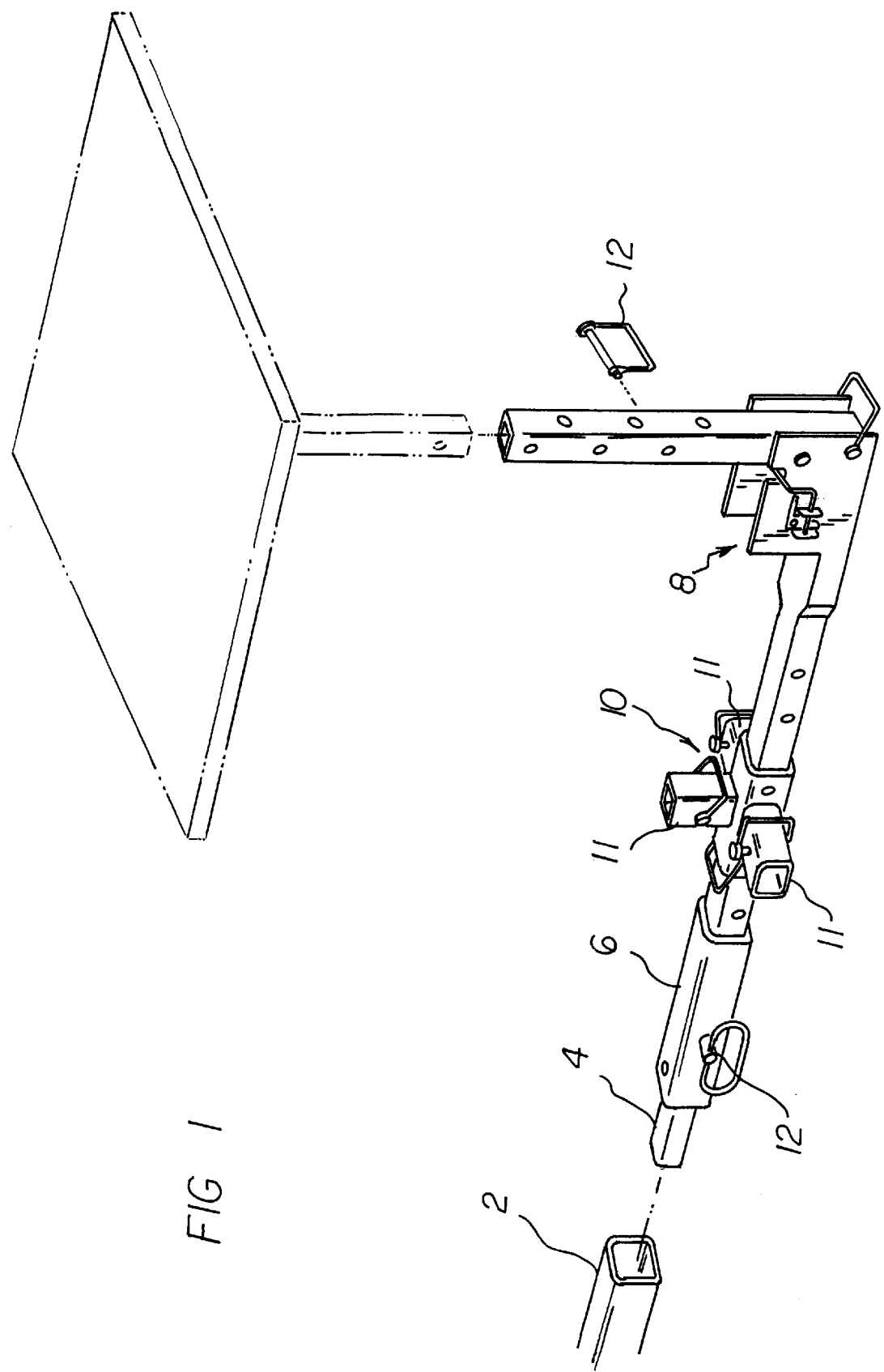
FIG. 1 is a perspective view of the present invention.

FIG. 1 is a perspective view of the present invention. Trailer hitch 2 can be seen in the left side of FIG. 1. Trailer hitch 2 has been specifically modified to accommodate the present invention. Trailer hitch 2 would preferably be square-shaped and hollowed out to receive an end of inner bar 4.

Inner bar 4 has two ends, a first end and a second end. The first end of inner bar 4 would be designed to be placed within trailer hitch 2. The second end of inner bar 4 would be inserted into the first end of support bar 6, which itself would have two ends, a first end and a second end. Support bar 6 itself would be a tubular piece with a square outer configuration.

Also shown can be seen L-mount 8 and intermediate T-coupling 10. L-mount 8 is fabricated from two pieces, a first piece and a second piece. The first piece and second piece of L-mount 8 would each have two ends, a first end and a second end. The first end of the first piece of L-mount 8 would be inserted into the second end of support bar 6. The first and of the first piece of L-mount 8 would have a plurality of holes on both the left side and the right side, with support bar 6 also including a plurality of holes on both the left side and right side. A user would be able to put a pin 12 or other mechanism through at least one hole in both support bar 6 and L-mount 8 to ensure that support bar 6 and L-mount 8 would be fixedly attached to one another.

Intermediate T-coupling 10 would be mountable upon L-mount 8. Intermediate T-coupling 10 would have a plurality of mounting docks 11 in which a user could place other objects or attach other objects to intermediate T-coupling 10. Each mounting dock 11 would have a retaining means to lock into place any object stuck into a particular mounting dock.

The second piece of L-mount 10 would be rotatably attached to the first piece of L-mount 10. The second end of the second piece of L-mount 10 would also allow a user to mount an object or objects in the second end of the second piece of L-mount 10. Further, at least one side of the second piece of L-mount 10 would have a plurality of holes evenly spaced out, with the preferable distance spacing out being approximately two inches between holes. Once an object had been placed within the second end of the second piece of L-mount 10, a user could place a pin 12 through at least one hole to help maintain the object in an upright set position.

What I claim as my invention is:

1. An apparatus for mounting heavy duty equipment to existing trailer hitch hardware on a vehicle comprising:
    (a) a trailer hitch having two ends, a first end and a second end, the first end of the trailer hitch attached to the rear of a vehicle, the second end of the trailer hitch being hollowed out, the trailer hitch being square-shaped,
    (b) a support bar having two ends, a first end and a second end, the support bar being square-shaped and hollow, the support bar having two side surfaces, a left side surface and a right side surface,
    (c) an inner bar having two ends, a first end and a second end, the first end of the inner bar being inserted into the second end of the trailer hitch, the second end of the inner bar being inserted into the first end of the support bar,
    (d) an L-mount fabricated from two pieces, a first piece and a second piece, the first piece of the L-mount having two ends, a first end and a second end, the first end of the L-mount being inserted into the second end of the support bar, the first piece of the L-mount being squared-shaped and having two sides, a left side and a right side, the L-mount having a plurality of holes evenly spaced out in linear fashion along the left side and the right side of the first piece, the second piece of the L-mount having two ends, a first end and a second end, the first end of the second piece of the L-mount being rotatably attached to the second end of the first piece of the L-mount, the second end of the L-mount being hollow and square-shaped,
    (e) an intermediate T-coupling, the T-coupling being mounted on the first piece of the L-mount, the T-coupling including a plurality of mounting docks, each mounting dock being square shaped and a few inches in length, each mounting dock being hollow to allow for temporary placement of objects or items to a mounting dock,
    (f) means for removably connecting the first end of the first piece of the L-mount to the support bar, and
    (g) means for removably connecting an object to the second end of the second piece of the L-mount.

2. An apparatus for mounting heavy duty equipment to existing trailer hitch hardware on a vehicle according to claim 1 wherein the means for removably connecting the first end of the first piece of the L-mount to the support bar further comprises:
    (a) a pin, the pin being circular, the pin having a diameter small enough to allow the pin to be inserted through a hole on the left side surface or the right side surface of the support bar,
    (b) whereby a user would place the first end of the first piece of the L-mount into the second end of the support bar, further whereby a user would place a pin through both a hole on a side surface of a support bar and a hole on the side of the L-mount, causing the first end of the L-mount to be removably attached to the support bar.

3. An apparatus for mounting heavy duty equipment to existing trailer hitch hardware on a vehicle according to claim 1 wherein the means for removably connecting an object to the second end of the second piece of the L-mount comprise
    (a) an object, the object having a bottom surface,
    (b) an extension attached to the bottom surface of the object, the extension being square-shaped, the extension have a diameter sufficient to be placed within the second end of the second piece of the L-mount,
    (c) a plurality of holes evenly spaced out in a linear fashion on at least one surface of the extension,
    (d) whereby a user would place the extension into the second end of the second piece of the L-mount, further whereby a user would place a pin through both a hole on a side surface of the second piece of the L-mount and a hole on the extension, causing the second end of the second piece of the L-mount to be removably attached to the extension.

* * * * *